(12) United States Patent
Facey et al.

(10) Patent No.: US 6,821,068 B2
(45) Date of Patent: Nov. 23, 2004

(54) LOAD HANDLING PALLETS AND LOAD STRAPPING MEANS

(75) Inventors: Hugh David Facey, Sheffield (GB); Brian Edward Shawcross, Retford (GB); John Makin, Rotherham (GB)

(73) Assignee: Loadhog Limited, Sheffield (GB)

( * ) Notice: Subject to any disclaimer, the term of this patent is extended or adjusted under 35 U.S.C. 154(b) by 0 days.

(21) Appl. No.: 10/311,424

(22) PCT Filed: Mar. 27, 2001

(86) PCT No.: PCT/GB01/01318
§ 371 (c)(1),
(2), (4) Date: Jul. 21, 2003

(87) PCT Pub. No.: WO01/96203
PCT Pub. Date: Dec. 20, 2001

(65) Prior Publication Data
US 2004/0101380 A1 May 27, 2004

(30) Foreign Application Priority Data

Jun. 16, 2000 (GB) .............................. 0014655
Jun. 16, 2000 (GB) .............................. 0014657
Jun. 16, 2000 (GB) .............................. 0014658

(51) Int. Cl.$^7$ .......................................... B65D 63/10
(52) U.S. Cl. ........................ 410/100; 410/46; 410/97; 410/99; 108/55.1; 206/597
(58) Field of Search ................. 410/46, 96, 97, 410/99, 100, 120; 108/55.1; 206/597

(56) References Cited

U.S. PATENT DOCUMENTS

| | | | | |
|---|---|---|---|---|
| 3,986,611 A | * | 10/1976 | Dreher ........................ | 206/597 |
| RE32,344 E | * | 2/1987 | Wind ......................... | 206/599 |
| 4,801,024 A | * | 1/1989 | Flum et al. ................ | 211/59.4 |
| 5,109,985 A | * | 5/1992 | Rose ......................... | 206/600 |
| 5,423,428 A | | 6/1995 | Selz .......................... | 206/597 |
| 5,617,967 A | * | 4/1997 | Neidhart .................... | 220/4.33 |
| 5,722,328 A | * | 3/1998 | Darby ....................... | 108/55.1 |
| 5,765,707 A | * | 6/1998 | Kenevan .................... | 220/4.28 |
| 6,216,607 B1 | * | 4/2001 | Cuddy ....................... | 108/55.5 |
| 6,524,040 B1 | * | 2/2003 | Heil ........................... | 410/67 |
| 2002/0148859 A1 | * | 10/2002 | Pigott et al. ............. | 222/185.1 |

FOREIGN PATENT DOCUMENTS

| | | |
|---|---|---|
| DE | 4229537 | 3/1994 |
| DE | 93167113 | 4/1995 |
| EP | 585832 | 8/1993 |
| JP | 10167267 | 6/1998 |

* cited by examiner

Primary Examiner—D. Glenn Dayoan
Assistant Examiner—Paul Chenevert
(74) Attorney, Agent, or Firm—Trexler, Bushnell, Giangiorgi, Blackstone & Marr, Ltd.

(57) ABSTRACT

Load strapping means for use with 4-way pallet comprises a cap (11) for placing on a load (17) on a 4-way pallet (16), at least two strapping strands (15) retractable through openings (26) into housings (14) at opposite sides (at least) of the cap, spring means within the housings for retracting the strapping strands, hooks (18) on the free ends of the strapping strands for engagement with the underside (21) of the platform (22) of a 4-way pallet, tensioning means within the housings for tightening the strapping strands between the cap and the pallet after interposing a load between the cap and the pallet, and stop means (34) for limiting retraction of the hooks into the housings when not engaged with a pallet. Such a cap (11) can be used without need to modify existing 4-way pallets, particularly—but not exclusively—those made of wood. Each hook (18) preferably has two prongs (19) spaced apart so as to fit one to each side of a middle spacer (20) of a 4-way pallet, without being in danger of damage or dislodgement by the forks of a fork-lift truck.

23 Claims, 8 Drawing Sheets

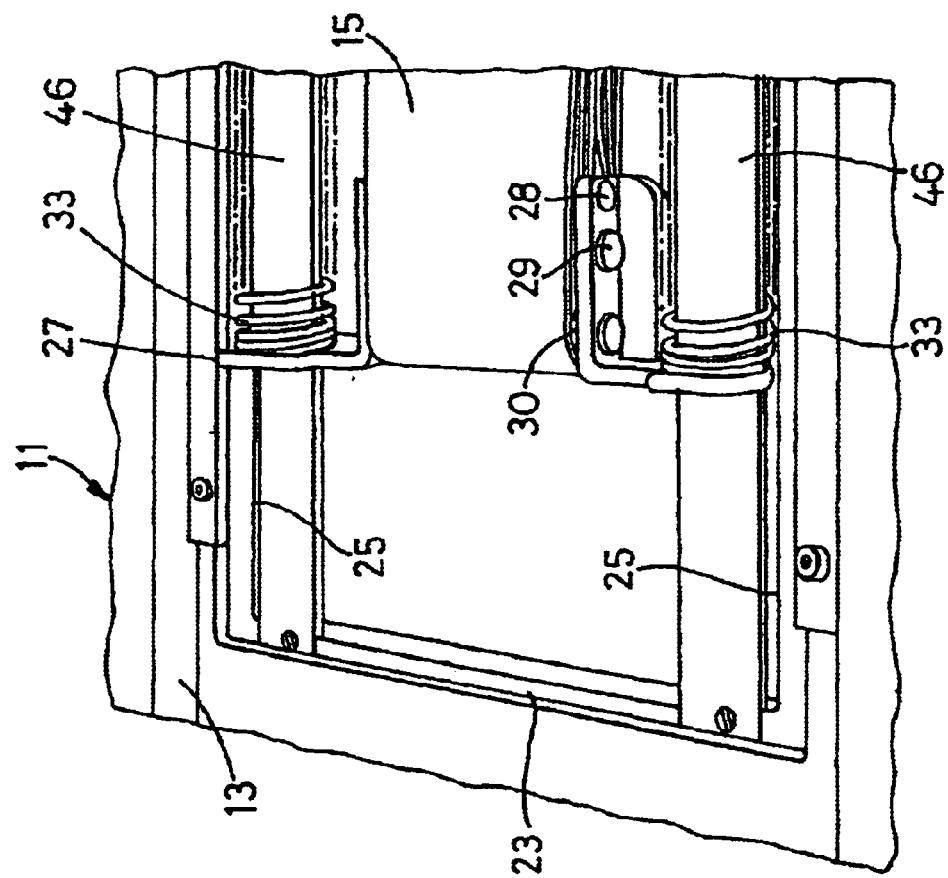
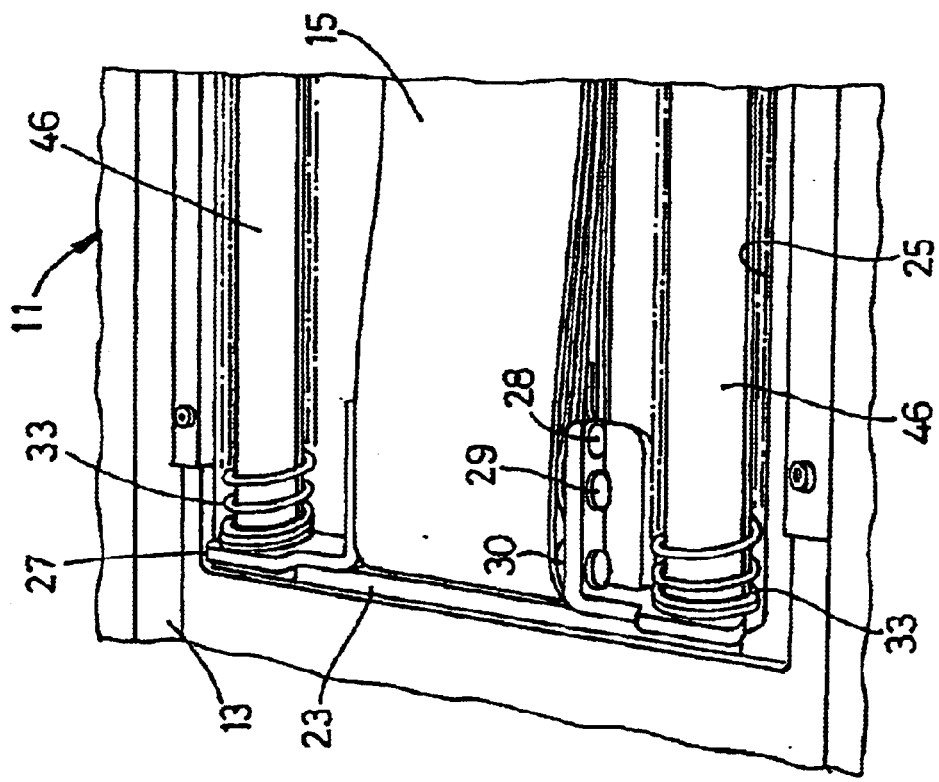

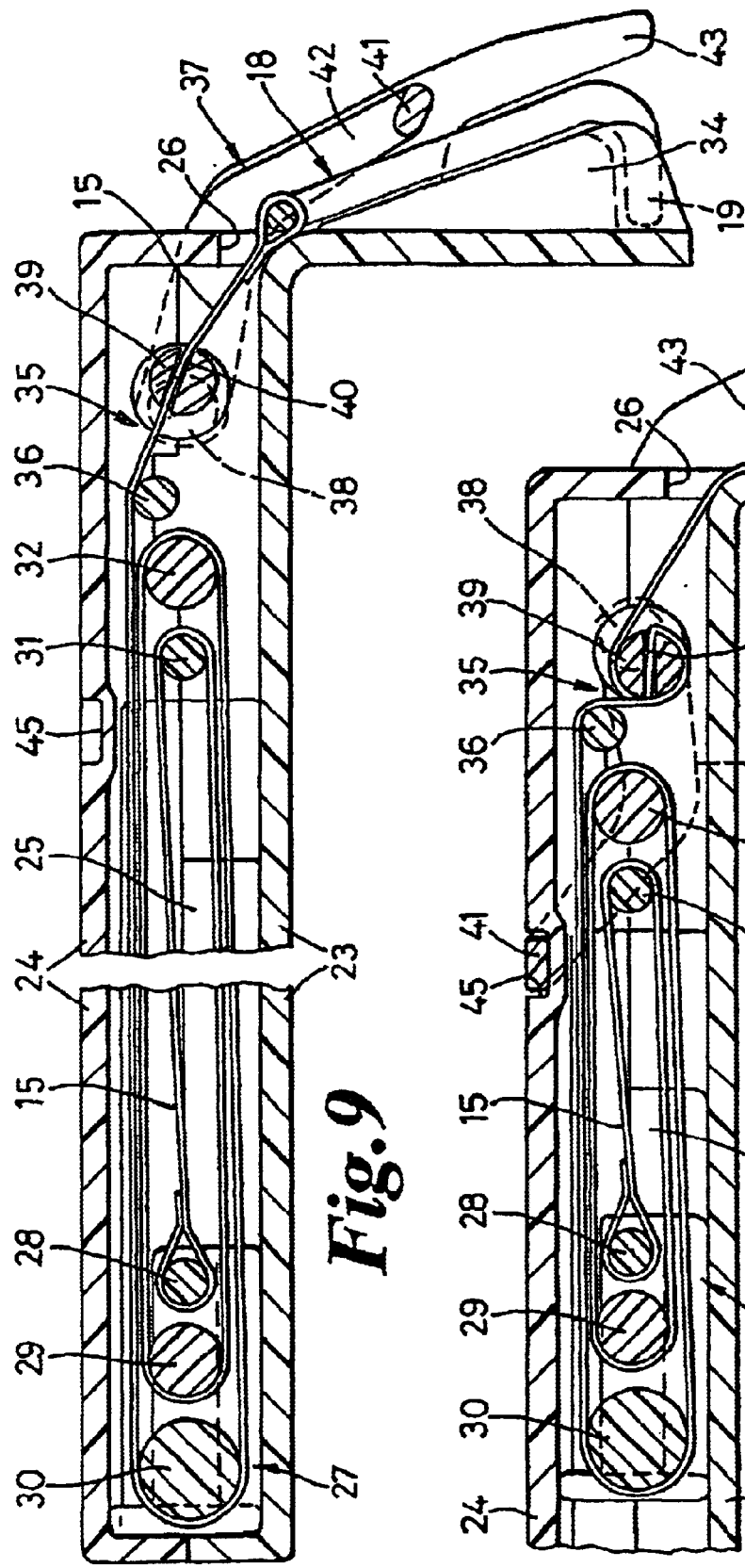

LOAD HANDLING PALLETS AND LOAD STRAPPING MEANS

This invention relates to load handling pallets and load strapping means.

It is known to provide a reel unit for incorporation in a load handling pallet, e.g., a 4-way pallet, comprising a housing, a shaft rotatably mounted within the housing, a drum mounted on and rotatable with the shaft, a strapping strand, e.g., a strap, wound on the drum, an opening in the housing through which the strapping strand emerges, attachment means on the free end of the strapping. strand for securing the strand toa load on a pallet or for securing to anchorage means on a pallet after passing the strand over a load on the pallet, a rewind spring coiled round the shaft alongside the drum, stop means preventing the attachment means being drawn through the opening into the housing by the action of the rewind spring, a ratchet concentric with the drum and rotatable with the drum and shaft, with a pawl for engaging teeth on the ratchet to stop or prevent pulling of the strapping strand from the drum, means for effecting engagement of the pawl with the ratchet, and manually operable means is provided for tensioning the strapping strand when the pawl has been engaged with a tooth on the ratchet.

A pallet is described in EP-A-0 585 832 with reel units secured alongside spacer blocks below one side of the load receiving platform of the pallet, the strapping strands are straps, and the attachment means are loops for engagement with ski-tensioner type anchorage means in housings secured alongside spacer blocks below the opposite side of the platform. Alternatively, tensioning devices could be incorporated in the straps, or in the reel units, one form of the latter having a second ratchet concentric with the drum and rotatable with the drum and shaft, with a second pawl for engaging the teeth of the second ratchet to prevent rewind of the strap, a manually-operable change-over means being provided for selectively rendering one or other of the pawls inoperative, and tension being applied to the belt by a lever operated drive pinion engaged with a driven gearwheel secured on the shaft.

Another pallet is described in JP-A-10167267 with reel units secured one in a corresponding outer side of each of four corner spacers moulded integrally with a load receiving platform, the strapping strands are straps, and the attachment means are loops while the anchorage means are hooks within the outer sides of the corner spacers not occupied by the reel housings, which housings also carry lever mechanisms for tensioning the straps when the pawls are engaged with the ratchets.

Although the reel units in EP-A-0 585 832 can be readily added to existing 4-way pallets, many of which are made of wood, they are prone to damage because of being. located where contact can take place with forks of the fork-lift trucks. On the other hand, while the reel units in JP-A-10167267 are protected somewhat from the forks of fork-lift trucks by being incorporated in the corner spacers, such pallets are expensive and so are not likely to replace the millions of existing 4-way pallets.

One object of the present invention is, therefore, the provision of load strapping means for use wit existing 4-way pallets, particularly—but not exclusively—those made of wood.

According to the present invention, load strapping means for use with 4-way pallets comprises a cap for placing on a load on a 4-way pallet, at least two strapping strands retractable through openings into housings at opposite sides of the cap, spring means for retracting the strapping strands, hooks on the free ends of the strapping strands for engagement with the underside of the platform of a 4-way pallet, tensioning means for tightening the strapping strands between the cap and the pallet after interposing a load between the cap and the pallet, and stop means for limiting retraction of the hooks into the housings when not engaged with a pallet.

Preferably, four strapping strands are provided, retractable into housings one on each side of the cap; and the positions of the housings in the cap preferably causes disposition of their openings to correspond to the middle spacers of a pallet. Alternatively, the cap may be in the form of a 'spider' constituted by four housings conjoined in a cruciform, and the housings may be hinged together at the ends remote from their openings, to enable the spider to be collapsed into a compact bundle for delivery or return to a distributor.

However, because many loads to be palletized require overall caps to distribute strapping and/or stacking loads, e.g., products such as foodstuffs in cardboard boxes and/or cartons, or caps with depending flanges to embrace loads made up of a plurality of boxes and/or cartons, it may be convenient to provide the housings within the thickness of the cap.

Each strapping strand may be a wire or nonmetallic rope retractably wound spirally on a 'thin' reel within the respective housing and having a short cylindrical core between annular flanges spaced apart by negligibly more than the overall diameter of the rope, so that the rope will be wound spirally on the core, the axis of the reel being perpendicular to the general plane of the cap, the core being on a shaft rotatably mounted within the housing, there also being provided a rewind spring coiled round the shaft alongside the reel, stop means limiting the extent to which the hook can be drawn into the housing by the action of the rewind spring, a ratchet concentric with the reel and rotatable with the reel and shaft, with a pawl for engaging teeth on the ratchet to stop or prevent pulling of the rope from the reel, and manually-operable means for tensioning the rope when the pawl has been engaged with a tooth on the ratchet, particularly characterized in that each tooth of the ratchet has a pawl-engageable face inclined forwardly from its radially inner end with respect to a radial line from the axis of be shaft through said radially inner end of said face and with respect to the direction of unwinding of the rope from the reel, the pawl has a complementary face for mutual engagement with said face of any one tooth of the ratchet, the pawl is provided with spring-loading means with manually-operable means for changing the effect of the spring-loading over between urging the pawl into engagement with the ratchet and towards a position holding the pawl clear of the ratchet, and in that the manually-operable tensioning means is by way of a separate wrench engageable with one end of the shaft. The angle of inclination of said face of each tooth of the ratchet is preferably at least 10° to said radial line from the axis of the shaft.

Having installed this reel unit in a cap to bear on a load on a pallet with the manually-operable changeover means for the spring-loading means of the pawl set to hold the pawl clear of the ratchet, the rope can be unwound from the reel, as by pulling the hook, to whatever extent is required or to enable the rope to be secured to the pallet by the hook, then the manually-operable change-over means is set for the spring-loading means to urge the pawl into engagement with the ratchet, whereupon the manually-operable tensioning means can be operated to tension the rope. Because of the mating complementary inclined faces of the pawl and any one of the teeth of the ratchet that it engages, the manually-operable change-over means can be set to the position in which the spring-loading means urges the pawl towards the position clear of the ratchet but without withdrawing the pawl from the ratchet until, when it is desired to release the load from the pallet, slight additional tensioning of the rope. effected as by means of a separate wrench applied to the shaft, the consequent slight rotation of the ratchet causes the mating complementary faces of the pawl and the engaged tooth to be separated enough for the spring-loading means to withdraw the pawl clear of the ratchet, whereafter the hook can be released from the pallet, so that the rewind spring is free to act on the shaft to enable the rope to be rewound on to the reel.

The spring-loading means is preferably a flexible tongue formed integrally with the pawl, and the manually-operable change-over means comprises a knob on the free end of the tongue of the pawl manually movable from one side of a projection on the housing to the other side of the projection, and the projection is preferably also resilient.

Because of the 'thinness' of such a reel, a pair of reels may be incorporated on a single shaft within a housing, with a single rewind spring, ratchet and pawl, the two openings from the housing for the two ropes being provided at sides of the cap adjacent to each other, a similar double-reel unit being provided for ropes to openings at the other two adjacent sides of the cap.

Alternatively, each strapping strand may be a strap, there being within the respective housing parallel guides between ends of the housing, at one end of which is the opening, a crosshead slidable along the guides towards and away from the opening, the crosshead being mainly constituted by crossbars of graduated diameters; a fixed array of graduated crossbars adjacent the opposite end of the housing from the crosshead, the axes of the crossbars in the crosshead and the fixed array all being in a common plane with the smallest diameter crossbars being the nearest to each other, the strap having its inner end secured to one of the smallest diameter crossbars and being lapped in multi-purchase array round the other smallest diameter crossbar and each successively greater diameter crossbar in the crosshead and fixed array in turn, and with the final lap of the strap emerging from the opening in the housing, and spring means to urge the crosshead away from the fixed array; the total length of strap that can be accommodated being principally dependent on the number and lengths of laps between the crosshead and the fixed array, and the number of laps being determined by the number of crossbars in the crosshead and in the fixed array (e.g. three crossbars in one and two in the other giving five laps), the diameters of the crossbars can be but a few millimetres each consistent with being strong enough to carry the loads in the strap generated by the spring means.

The crossbars, in both the crosshead and in the fixed array, other than that smallest one to which the strap is secured, may be rollers rotatable with respect to side cheeks of the crosshead slidable along the guides or side cheeks secured to or integral with one end of the housing; or some or all of them may be non-rotatable and provided with low friction surfaces.

The guides may be channels along which slide wings on the crosshead and accommodating coil compression springs. Alternatively the guides may be bars passing through the crosshead and encircled by coil compression springs. Alternatively, the spring means may be a tension spring or springs.

The tensioning means may be a lever mechanism with an over-centre locking action, or with a rotational device within the housing adjacent the opening with a push-lock action or spring catch.

The stop means for preventing the hook being drawn through the opening into the housing may be afforded by making the hook wider than the opening, and the latter may be recessed within the housing end so that the hook will not project significantly therefrom when the strap is fully retracted. Alternatively a recess may be provided in the underside of the cap or lid for engagement by the hook Each hook preferably has two prongs spaced apart by at least the width of a middle spacer of a pallet, so that the prongs can engage the underside of the platform one to each side of the spacer, without being in danger of damage or dislodgement by the forks of a fork-lift truck. Conveniently, when not engaged with a pallet the hooks engage the housings around the opening, the housings thus constituting the stop means; and the openings are preferably recessed with respect to the sides of the cap, so that when not engaged with a pallet the hooks are shrouded within the sides of the cap where they cannot cause injury to personnel.

The cap may be nestable within similar caps and/or with a pallet, for convenience when returning caps and pallets to a distributor.

A transponder may be incorporated in the cap, to enable the cap and/or load secured thereby on a pallet to be tracked or traced.

Three embodiments of the invention will now be described, by way of example only, with reference to the accompanying drawings, in which:

FIG. 7 is a fragmentary perspective view of the other end of the unit with the top part of the housing removed and the exposed parts of the mechanism in positions corresponding to FIGS. 1, 4 and 5;

FIG. 8 is a similar view to FIG. 7 but showing the exposed parts in positions corresponding to FIGS. 2 and 6;

FIG. 9 is a longitudinal vertical section through both ends of the unit with the parts of the mechanism in positions corresponding to FIGS. 1, 4 and 5;

FIG. 10 is a similar view to FIG. 9 but showing only the outer end of the unit with the parts of the mechanism in positions corresponding to FIGS. 2 and 6.

Figure 11:
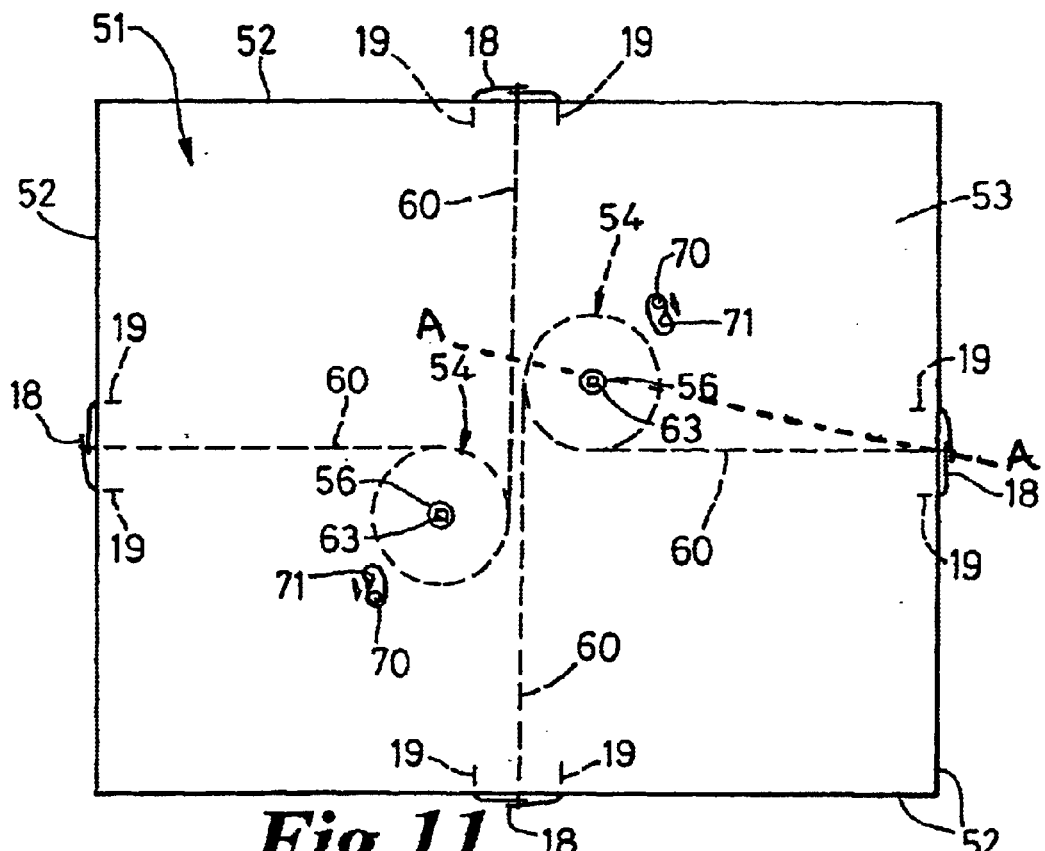
FIG. 11 is a diagrammatic plan view of a cap in accordance with the invention incorporating four retractable strapping ropes.
Figure 12:
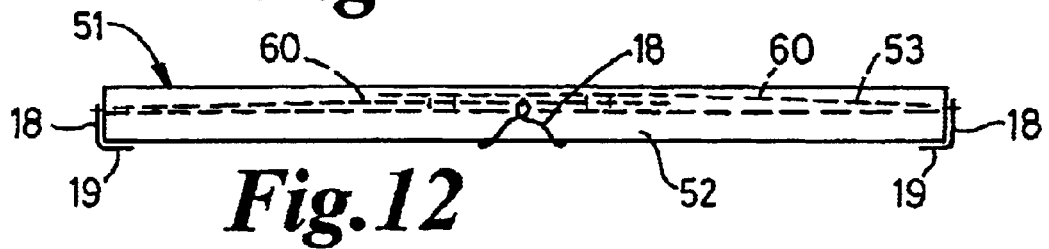
FIG. 12 is a side elevation of the cap of FIG. 11.
Figure 14:
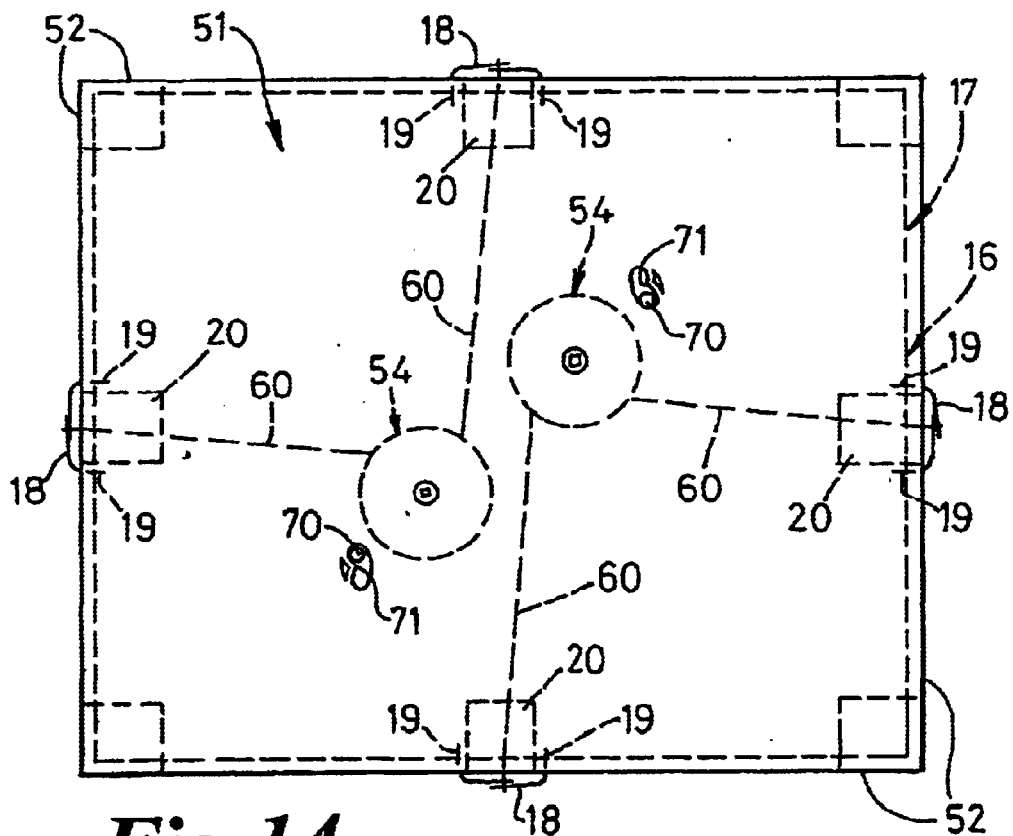
Figure 15:
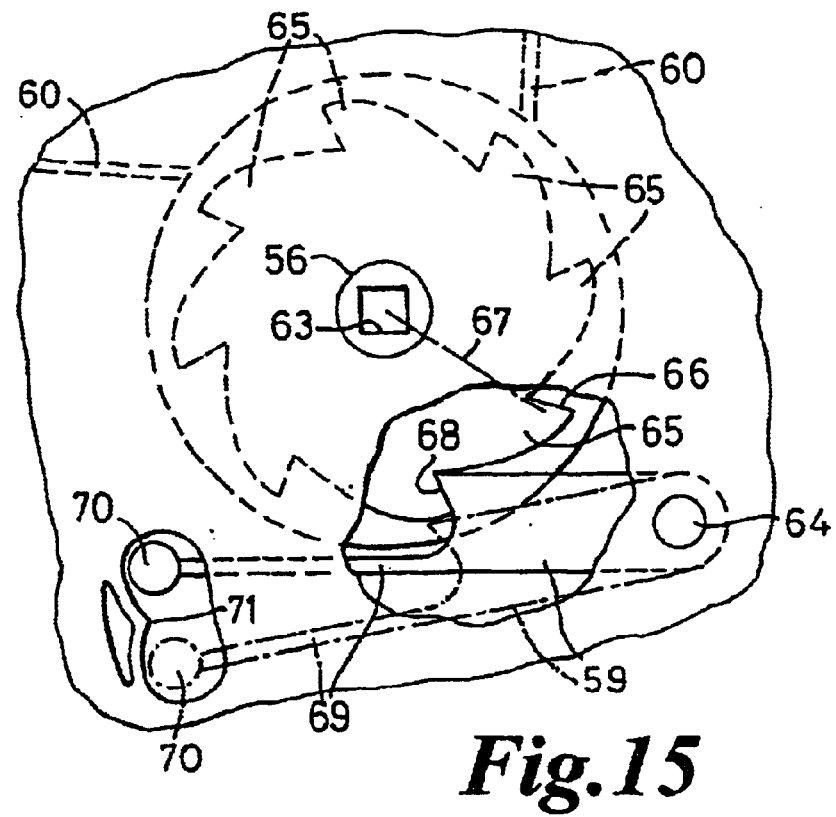

FIG. 14 corresponds to FIG. 11 but shows the strapping ropes drawn out to secure a load on a pallet; and FIG. 15 is an enlarged fragmentary plan view of part of FIG. 14 showing the detail of tensioning-locking mechanism for two of the ropes.

Figure 1:
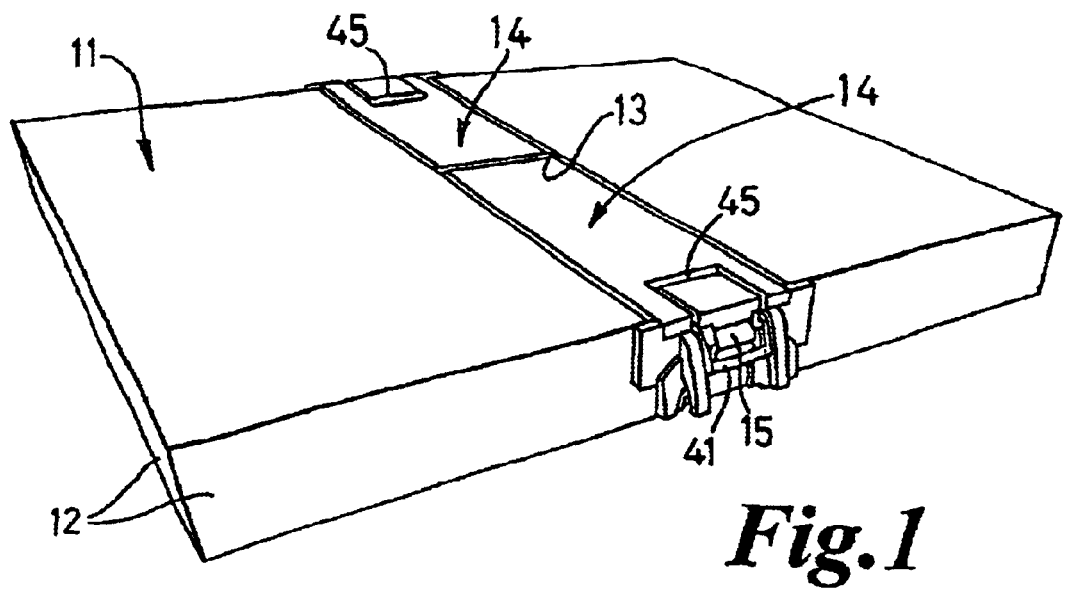
FIG. 1 is a perspective view of a cap in accordance with the invention incorporating a pair of units in which retractable straps are stored.
Figure 2:
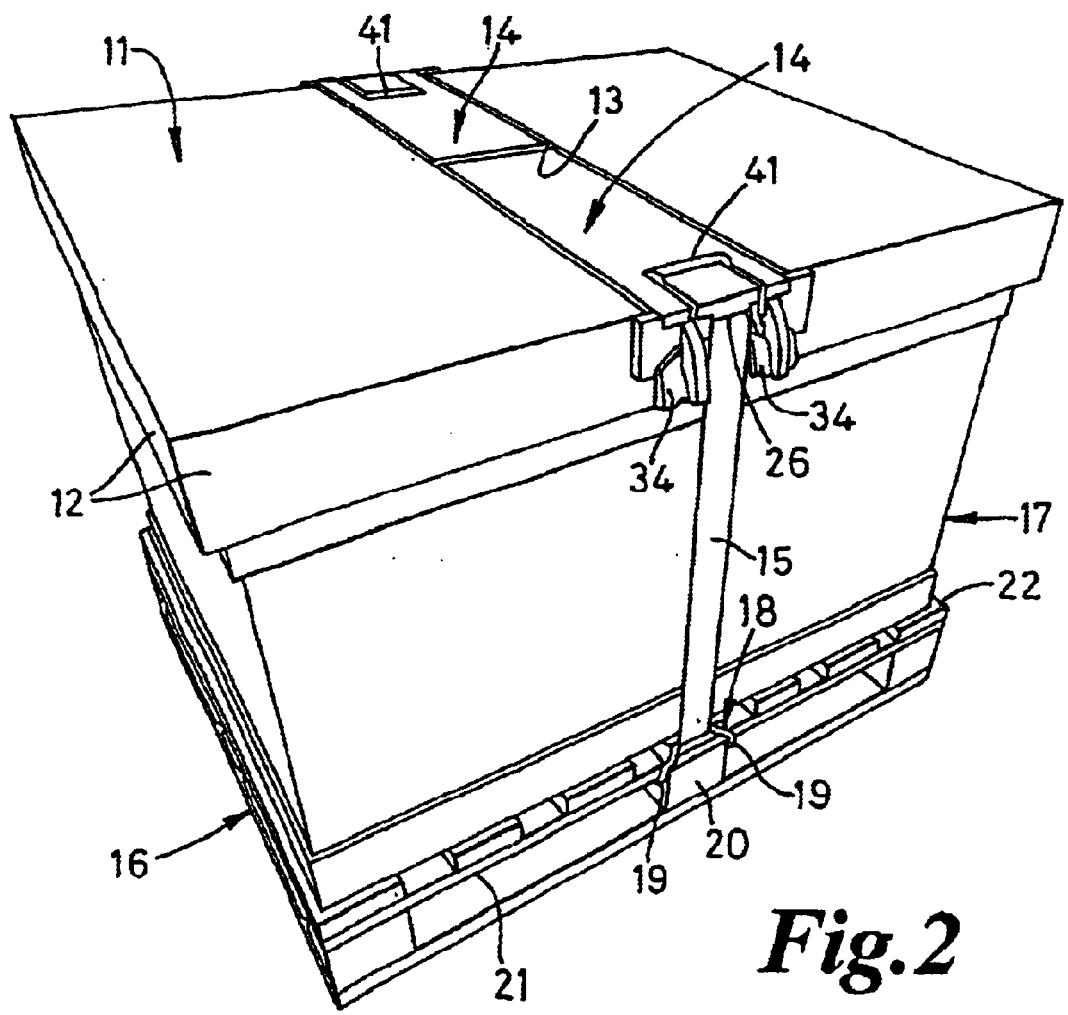
FIG. 2 is a perspective view showing the cap of FIG. 1 in use securing a load on a pallet.

In FIG. 1 a rectangular cap 11 having flanges 12 along all four sides has a recess 13 accommodating two units 14 for retractable straps 15 (only one being visible) for use with a pallet 16, see FIG. 2, for securing a load 17 thereon, each strap having at a free end thereof attachment means in the form of a two-pronged hook 18 having its prongs 19 spaced apart by at least the width of a middle spacer 20 of the pallet so as to be able to engage anchorage means 21 constituted by the underside of the platform 22 of the pallet with a prong to each side of the spacer.

Figure 3:
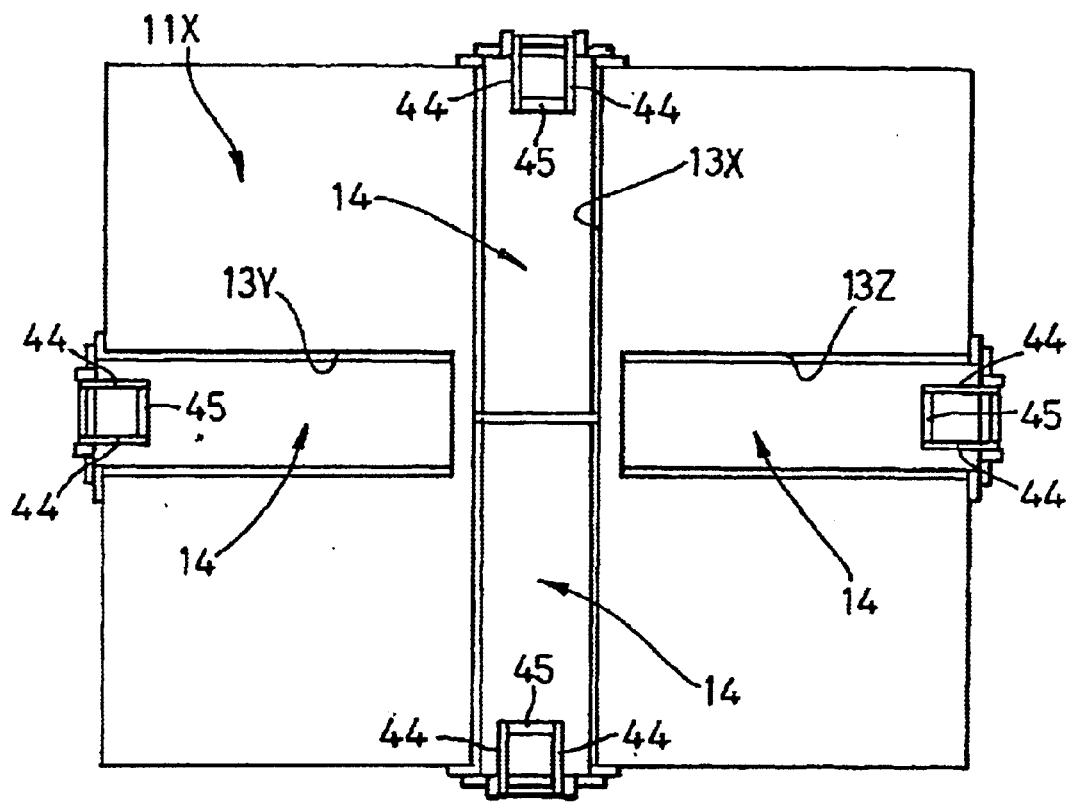
FIG. 3 is a plan view of a cap in accordance with the invention incorporating four units with retractable straps.
Figure 4:
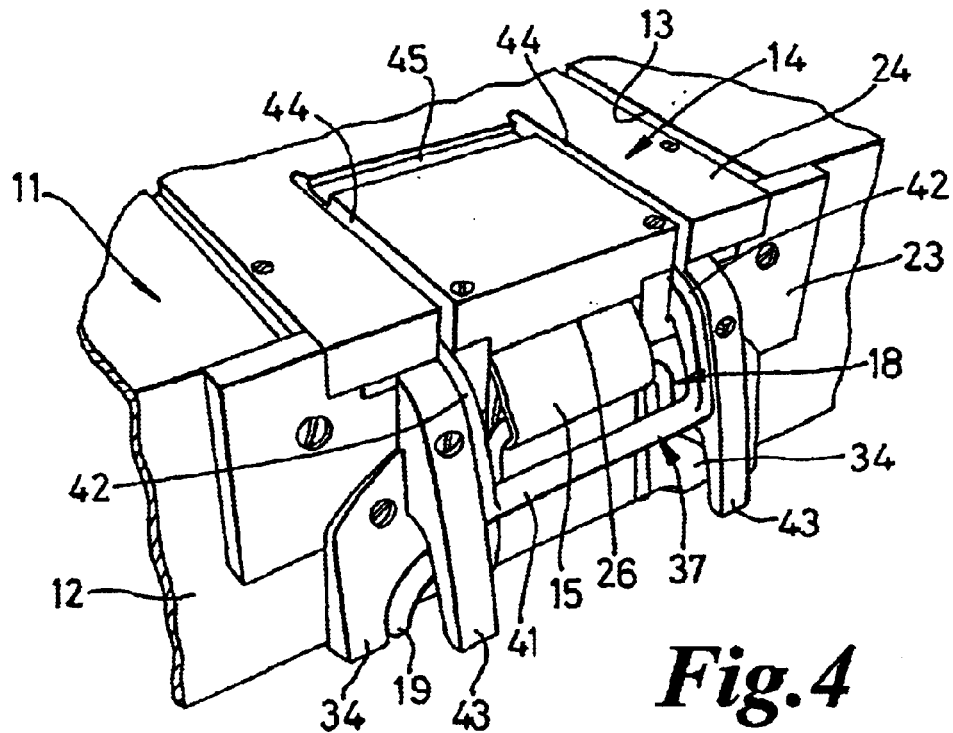
FIG. 4 is a fragmentary perspective view of part of FIG. 1 to a larger scale.
Figure 5:
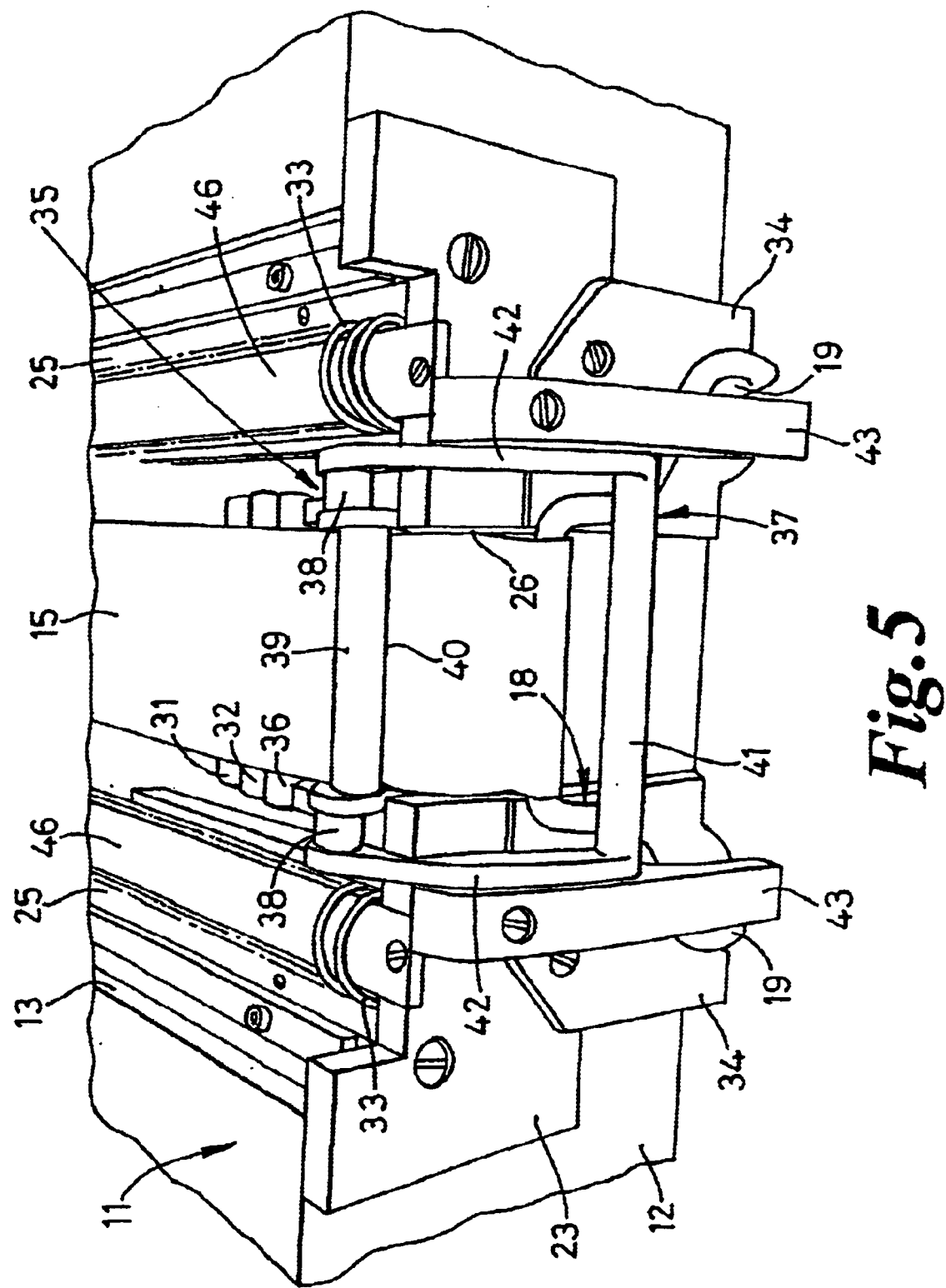
FIG. 5 is a fragmentary perspective view of the same part of FIG. 1 to a larger scale and with the top part of the housing of the unit removed.
Figure 6:
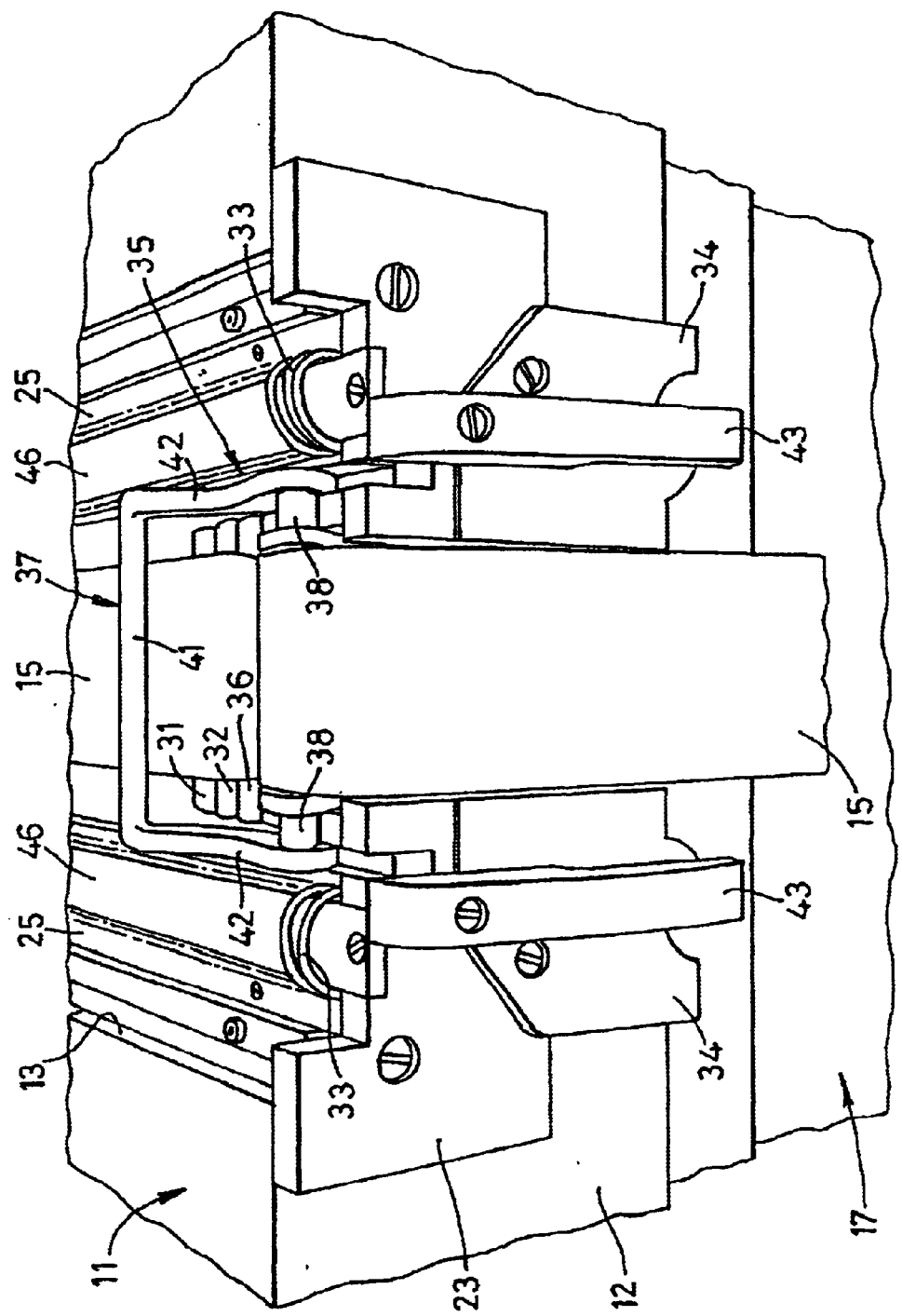
FIG. 6 is a fragmentary perspective view of the same part as seen in FIG. 2 to a larger scale and again with the top part of the housing removed.

In FIG. 3 a cap 11X has three recesses 13X, 13Y, 13Z accommodating four units 14 for retractable straps(none being visible) for use with a pallet (not shown) in similar manner to that shown in FIG. 2 but affording greater secureness of a load on the pallet.

The construction of a unit 14 and its mechanisms for tensioning its strap 15 and also for retracting its strap, will now be described in detail with reference to FIGS. 4 to 10.

The unit 14 comprises a housing formed by separable parts, a lower part 23 and an upper part 24, parallel guides 25 longitudinally of the housing, an opening 26 adjacent one end of the housing for emergence of the strap 15 stored within the housing; a crosshead 27 slidable along the guides towards and away from the opening, the crosshead being principally constituted by crossbars 28, 29, 30 of graduated diameters; a fixed array of graduated crossbars 31, 32 adjacent the opposite end of the housing from the crosshead (i.e. adjacent the opening 26), the axes of the crossbars in the crosshead and in the fixed array all being parallel and in a common plane with the smaller diameter crossbars 28, 31 being the nearest to each other; the strap 15 having its end remote from the attachment means 18 secured to the smallest diameter crossbar 28 of the crosshead 27 and being lapped in multi-purchase array round the other smallest crossbar 31 and each successively greater diameter crossbar, 29, 32, 30 in the crosshead and the fixed array in turn and with th final lap emerging from the opening 26 in the housing 23, 24 and being secured to the hook 18; spring means constituted by coil compression springs 33 to urge the crosshead 27 away from the fixed array of crossbars 31, 32; stop means 34 for limiting the extent to which the attachment means(i.e., the hook 18) can be drawn into the housing by the action of the spring means urging the crosshead away from the fixed array; and manually-operable means 35 (to be described in detail presently) for tensioning the strap 15 between the housing and the attachment means after the strap has been disposed for securing a load on a pallet, as shown in FIG. 2.

The manually-operable tensioning means 35 comprises a cross-pin 36 fixedly mounted parallel to the fixed array of crossbars 31, 32 and between that array and the opening 26, a U-shaped lever 37 on an axis 38 parallel to the cross-pin and mounted between that cross-pin and the opening 26, and a slotted crossbar 39 having an axis parallel to but offset from axis 38 between the arms of the lever extending parallel to the cross-pin and adapted to be swung, by movement of the lever from an inoperative position (see FIGS. 1, 2, 4, 5 and 9) to a locking position (see FIGS. 6 and 10), from a position remote from the cross-pin (see particularly FIG. 9) to a position closely adjacent the cross-pin (see particularly FIG. 10), the slot 40 in the crossbar 39 being of a width and disposed such that when the crossbar 39 is in its position remote from the cross-pin 36 the strap 15 passes freely through the slot (as shown in FIG. 9) and whereby as the crossbar 39 is being swung towards its position closely adjacent the cross-pin (by swinging of the lever 37 from the inoperative position to locking position) the strap 15 is tensioned by being wrapped round the crossbar 39 into an S-shape and partially round the cross-pin 36 as the crossbar 39 approaches the cross-pin (as shown in FIG. 10).

The throw of the lever 37 is about 180° and will suffice to apply considerable tension to the strap 15 after the hook 18 has been engaged with a pallet and slack in the strap has been taken up by the spring means 33 urging the crosshead 27 away from the fixed array of crossbars 31, 32.

Spring or detent means may be provided to retain the lever 37 in locking position, but friction between the strap 15 and the cross-pin 36 may be sufficient to retain the lever in locking position, especially if a nipping of the strap 15 between the crossbar 39 and the cross-pin 36 results from the closeness of approach of the crossbar 39 to the cross-pin.

Swinging of the lever 37 is effected by grasping the handlebar 41 between the arms 42 of the lever. In the inoperative position the lever is protected from accidental contact by a pair of cheeks 43 which are extended downwardly to provide protection also for the hook 18. A pair of slots 44 in the upper part 24 of the housing accommodates the arms 42 of the lever as they swing from inoperative position to locking position, in which latter position the handlebar 41 of the lever is accommodated in a groove 45 between the slots 44 thus protecting it from accidental contact.

The coil compression springs 33 are shown encircling rigid strips 46 extending the full length of the lower part 23 of the housing, merely to hold the springs 33 in place during assembly, as slight pre-compression in the springs would otherwise cause them to bow and spring out.

In FIGS. 11 to 15 a rectangular cap 51 having flanges 52 along all four sides has a housing 53 accommodating two reel units 54 each comprising a pair of reels 55 on a single shaft 56, with a single rewind spring 57, ratchet 58 and pawl 59. On each reel 55 is spirally wound a wire or nonmetallic rope 60 extending from its reel to an opening 61 in a side of the housing 53, the two openings for either of th two ropes from either twin-reel unit 54 being provided at sides of the cap 51 adjacent to each other.

Hooks 18 on the free ends of the rope 60 are again provided with two prongs 19 each spaced apart by at least the width of middle spacers 20 of a pallet 16 (see FIG. 14), so that the prongs can engage the underside of the platform of the pallet one to each side of a middle spacer after the cap 51 has been placed on a load 17 on the pallet and the hooks pulled down to draw the ropes 60 from the housing 53. Each hook 18 has a wider span than the width of the respective opening 61 in the housing, so as constitute stop means limiting the extent to which the hooks can be drawn into the housing.

Figure 13:
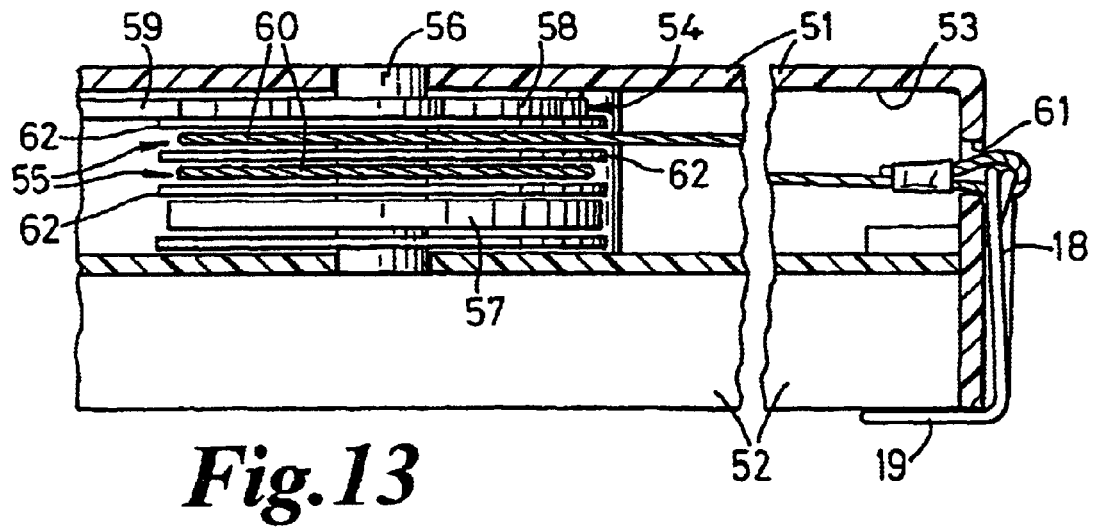
FIG. 13 is an enlarged detailed fragmentary section on the line A—A in FIG. 11.

As can be seen in FIG. 13 each reel 55 has a short cylindrical core on the shaft 56 between annular flanges 62 (the middle flange being common to both reels) spaced apart by negligibly more than the overall diameter of the ropes 60, so that the ropes, being wound spirally, will not bind within the reels. The shaft 56 rotatably mounted in the housing 53 and the ratchet 58 is rotatable with the reels 55 and the shaft 56, which is provided at one end with a square socket 63 (see FIG. 15) engageable by a separate wrench (not shown) constituting manually-operable means for effecting tensioning of the ropes 60 after engagement of the hooks 18 with a pallet 16 as described above.

The pawl 59 is mounted on a pivot 64 to enable it to be engaged with teeth 65 on the ratchet 58 to stop or prevent pulling of the ropes 60 from the reels 55. Each tooth 65 has a pawl-engageable face 66 inclined forwardly from its radially inner end with respect to a radial line 67 from the axis of the shaft 56 through said radially inner end of said face and with respect to the direction of unwinding of the ropes 60 from the reels 55, and the pawl 59 has a complementary face 68 for mutual engagement with said face 66 of any one tooth 65 of the ratchet 58. The pawl 59 is provided with spring-loading means (in the form of a flexible tongue 69) with manually-operable change-over means (in the form of a knob 70 on the end of the tongue movable from one side to the other of a flexible projection 71 on the housing 53) for changing the effect of the spring-loading over between urging the pawl 59 into engagement with the ratchet 58 (as shown in full line in FIG. 15) and towards a position holding the pawl clear of the ratchet (as shown in 'dash-dot' line in FIG. 15). The angle of inclination of said face 66 of each tooth 65 of the ratchet 58 is at least 10° to said radial line 67 from the axis of the shaft 56.

With the manually-operable change-over means 70 for the spring-loading means 69 of the pawl 59 set to hold the pawl clear of the ratchet 58 (as shown in 'dash-dot' line in FIG. 15), the ropes 60 can be unwound from the reels, as by pulling the hooks 18, to whatever extent is required to enable the ropes to be secured to a pallet 16 as aforesaid, then the manually-operable change-over means 70 is set for the spring-loading means 69 to urge the pawl 59 into engagement with the ratchet 58, whereupon the manually-operable tensioning means (i.e., a separate wrench engaged with the square socket 63 in one end of the shaft 56) can be operated to tension the ropes. Because the mating complementary inclined faces 68,66 of the pawl any one of the teeth 65 of the ratchet 58 that it engages, the manually-operable change-over means 70 can be set to the position (shown in 'dash-dot' line in FIG. 15) in which the spring-loading means 69 urges the pawl 59 towards the position clear of the ratchet 58 but without withdrawing the pawl from the ratchet until, when it is desired to release the load 17 from the pallet 16, slight additional tensioning of the ropes 60 (effected by means of the separate wrench again applied to the shaft 56) the consequent slight rotation of the ratchet 58 causing the mating complementary faces 68, 66 of the pawl 59 and the engaged tooth 65 to be separated enough for the spring-loading means 69 to withdraw the pawl clear of the rachet (i.e. back to the position shown in 'dash-dot' line in FIG. 15), whereafter the hooks 18 can be released from the pallet 16, so that the rewind spring 57 is free to act on the shaft 56 to enable the ropes 60 to be rewound onto the reels 55.

It will be appreciated that, while a primary object is to provide load strapping means for use with 4-way pallets, the caps described herein can be used with 2-way pallets especially ones with only two strapping strands each at opposite sides of the cap, such as described with reference to FIGS. 1 and 2 of the accompanying drawings.

What is claimed is:

1. Load strapping means for use with 4-way pallets comprising: a cap for placing on a load on a 4-way pallet, at least two strapping strands retractable through openings into housings at opposite sides of the cap, spring means for retracting the strapping strands, hooks on the free ends of the strapping strands for engagement with the underside of the platform of a 4-way pallet, tensioning means for tightening the strapping strands between the cap and the pallet after interposing a load between the cap and the pallet, and stop means for limiting retraction of the hooks into the housings when not engaged with a pallet.

2. Load strapping means as in claim 1, characterized in that the cap has depending flanges to embrace loads made up of a plurality of boxes and/or cartons and the housings are provided within the thickness of the cap.

3. Load strapping means as in claim 1, characterized in that four strapping strands are provided, retractable into housings one on each side of the cap.

4. Load strapping means as in claim 3, characterized in that the positions of the housings in the cap causes disposition of their openings to correspond to the middle spacers of a pallet.

5. Load strapping means as in claim 1, characterized in that each hook has two prongs spaced apart by at least the width of a middle spacer of a pallet, so that the prongs can engage the underside of the platform one to each side of the spacer without being in danger of damage or dislodgement by the forks of a fork-lift truck.

6. Load strapping means as in claim 5, characterized in that when not engaged with a pallet the hooks engage the housings around the opening, the housings thus constituting the stop means.

7. Load strapping means as in claim 1, characterized in that each strapping strand is a wire or non-metallic rope retractably wound spirally on a reel within the respective housing and having a short cylindrical core between annular flanges spaced apart by negligibly more than the overall diameter of the rope, so that the rope will be wound spirally on the core, the axis of the reel being perpendicular to the general plane of the cap, the core being on a shaft rotatably mounted within the housing, there also being provided a rewind spring coiled round the shaft alongside the reel, stop means limiting the extent to which the hook can be drawn into the housing by the action of the rewind spring, a ratchet concentric with the reel and rotatable with the reel and shaft, with a pawl for engaging teeth on the ratchet to stop or prevent pulling of the rope from the reel, and manually-operable means for tensioning the rope when the pawl has been engaged with a tooth on the ratchet, and particularly characterized in that each tooth of the ratchet has a pawl-engageable face inclined forwardly from its radially inner end with respect to a radial line from the axis of the shaft through said radially inner end of said face and with respect to the direction of unwinding of the rope from the reel, the pawl has a complementary face for mutual engagement with said face of any one tooth of the ratchet, the pawl is provided with spring-loading means with manually-operable means for changing the effect of the spring-loading over between urging the pawl into engagement with the ratchet and towards a position holding the pawl clear of the ratchet, and in that the manually-operable tensioning means is by way of a separate wrench engageable with one end of the shaft.

8. Load strapping means as in claim 7, characterized in that the angle of inclination of said face of each tooth of the ratchet is at least 10° to said radial line from the axis of the shaft.

9. Load strapping means as in claim 7, characterized in that a pair or reels is incorporated on a single shaft within a housing, with a single rewind spring, ratchet and pawl, the two openings from the housing for the two ropes being provided at sides of the cap adjacent to each other, a similar double-reel unit being provided for ropes to openings at the other two adjacent sides of the cap.

10. Load strapping means as in claim 7, characterized in that the spring-loading means is a flexible tongue formed integrally with the pawl, and the manually-operable change-over means comprises a knob on the free end of the tongue of the pawl manually movable from one side of a projection on the housing to the other side of the projection.

11. Load strapping means as in claim 10, characterized in that the projection is resilient.

12. Load strapping means as in claim 1, characterized in that each strapping strand is a strap, there being within the respective housing parallel guides between ends of the housing, at one end of which is the opening; a crosshead slidable along the guides towards and away from the opening, the crosshead being mainly constituted by crossbars of graduated diameters; a fixed array of graduated crossbars adjacent the opposite end of the housing from the crosshead, the axes of the crossbars in the crosshead and the fixed array all being in a common plane with the smallest diameter crossbars being the nearest to each other, the strap having its inner end secured to one of the smallest diameter crossbars and being lapped in multi-purchase array round the other smallest diameter crossbar and each successively greater diameter crossbar in the crosshead and fixed array in turn, and with the final lap of the strap emerging from the opening in the housing, and spring means to urge the crosshead away from the fixed array; the total length of strap that can be accommodated being principally dependent on the number and lengths of laps between the crosshead and the fixed array, and the number of laps being determined by the number of crossbars in the crosshead and in the fixed array.

13. Load strapping means as in claim 12, characterized in that there are three crossbars in the crosshead and two crossbars in the fixed array.

14. Load strapping means as in claim 12, characterized in that the crossbars, in both the crosshead and in the fixed array, other than that smallest one to which the strap is secured, are rollers rotatable with respect to side cheeks of the crosshead slidable along the guides or side cheeks secured to or integral with one end of the housing.

15. Load strapping means as in claim 12, characterized in that some or all of the crossbars are non-rotatable and provided with low friction surfaces.

16. Load strapping means as in claim 12, characterized in that the guides are channels along which slide wings on the crosshead and accommodating coil compression springs.

17. Load strapping means as in claim 12, characterized in that the guides are bars passing through the crosshead and encircled by coil compression springs.

18. Load strapping means as in claim 12, characterized in that the spring means is a tension spring or springs.

19. Load strapping means as in claim 12, characterized in that the tensioning means is a lever mechanism with an over-centre locking action.

20. Load strapping means as in claim 12, characterized in that the tensioning means is a lever mechanism with a rotational device within the housing adjacent the opening with a push-lock action.

21. Load strapping means as in claim 12, characterized in that the tensioning means is a lever mechanism with a rotational device within the housing adjacent the opening with a spring catch.

22. Load strapping means as in claim 12, characterized in that the stop means for preventing the hook being drawn through the opening into the housing is afforded by making the hook wider than the opening.

23. Load strapping means as in claim 22, characterized in that the opening is recessed within the housing end so that the hook will not project significantly therefrom when the strap is fully retracted.

* * * * *